Aug. 1, 1961   A. M. STOTT   2,994,309
DAMPER JETTISONING CANOPY REMOVER
Filed March 5, 1959
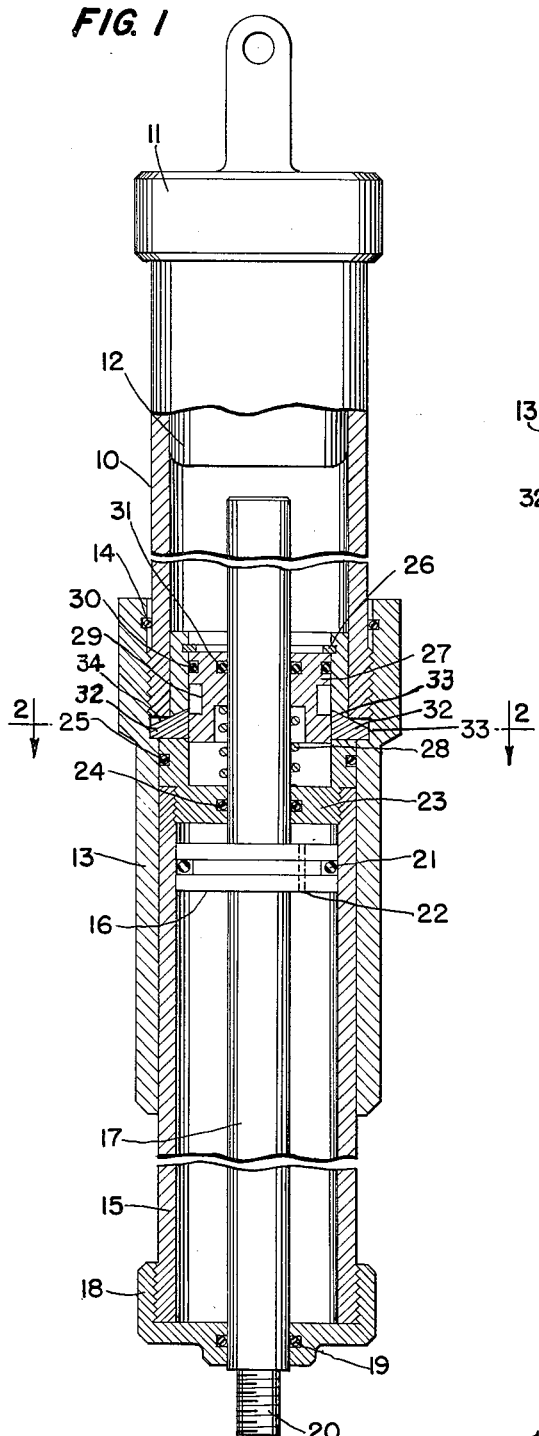
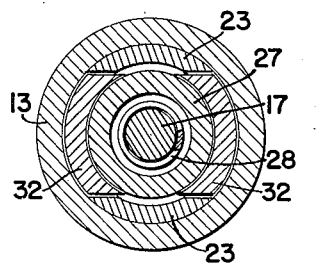
INVENTOR.
ALBERT M. STOTT

United States Patent Office 2,994,309
Patented Aug. 1, 1961

2,994,309
DAMPER JETTISONING CANOPY REMOVER
Albert M. Stott, Aldan-Clifton Heights, Pa., assignor to the United States of America as represented by the Secretary of the Army
Filed Mar. 5, 1959, Ser. No. 797,822
3 Claims. (Cl. 123—24)
(Granted under Title 35, U.S. Code (1952), sec. 266)

The invention described herein may be manufactured and used by or for the Government for governmental purposes without the payment to me of any royalty thereon.

This invention relates to aircraft canopy removers and more especially to an improved canopy remover including a damper or buffer which (1) functions during its normal operation to control the opening and closing speed of the canopy, and (2) in the case of an emergency is automatically disconnected and moved away from the remainder of the canopy remover with a dampening action during the initial part of its movement.

Canopy removers heretofore available have included various types of dampers for controlling the opening and closing speeds of the canopy during normal operation. In case of an emergency, it is highly desirable that the damper in no way impede the removal of the canopy and that the initial motion of the canopy be dampened to reduce the shock incident to the firing of the explosive cartridge by which removal of the canopy is effected. In accordance with the present invention, these results are achieved by a canopy remover wherein the damper is automatically released in response to a gas pressure and moves away from the remainder of the apparatus with a motion which is initially dampened by the action of the moving damper.

The invention will be better understood from the following description when considered in connection with the accompanying drawing and its scope is indicated by the appended claims.

Referring to the drawings—

FIG. 1 is a sectional view of the canopy remover, and
FIG. 2 is a section taken on the line 2—2 of FIG. 1.

The drawing illustrates a canopy remover having a casing 10 which is threaded at one end and has at its other end a cap 11 adapted to be fixed to an aircraft. Located within this casing is an explosive cartridge 12, the firing of which generates the gas pressure required for emergency operation of the canopy remover.

Threaded onto the end of the casing 10 is an extension 13 which has a seal ring 14 between it and the casing 10 and has extending into it a cylinder 15. This cylinder contains a buffer material such as oil and encloses a piston 16 which is fixed to a rod 17 extending through an end cap 18 threaded onto the end of the cylinder. The piston rod 17 has between it and the end cap 18 a seal ring 19 and is threaded at its outer end 20 for attachment to the canopy. The piston 16 is encircled by a seal ring 21 and has one or more perforations or orifices 22.

Threaded into the inner end of the cylinder 15 is a cup shaped member 23 which has a seal ring 24 between it and the rod 17 and a seal ring 25 between it and the extension 13 of the casing 10. The cup shaped member 23 has near its open end an inner groove which receives a snap ring 26. This ring functions as a stop for a latch unlock piston 27 which is biased against the stop ring by a spring 28. As shown more clearly in FIG. 2, the unlock piston 27 is partly surrounded by semi-circular latches 32 which, in their illustrated positions, lock the cup-shaped member 23 to the casing 10—13. When the latch unlock piston 27 moves to a point where the recess 29 registers with the latches 32, however, the gas pressure on the edge of the cup-shaped member produces between the surfaces 33 and 34 a wedging action whereby the latches are moved into the recess.

The piston 27 has a central groove 29 in its outer periphery and has seal rings 30 and 31 at its opposite sides.

The operation of the improved canopy opener can be readily understood. In its illustrated and normal operation condition, the unlock piston 27 maintains latches 32 in their outermost positions so that the cylinder 15 and the cup shaped member 23, together with everything they enclose, are locked to the casing 10—13. Under these conditions movement of the piston 16 in the oil enclosed within the cylinder 15 merely functions to control the opening and closing speed of the canopy attached to the rod 17.

In the case of an emergency, however, the cartridge 12 is fired and the gas generated thereby forces the unlock piston 27 to compress the spring 28 until the latches 32 are cammed into the slot 29. This camming action is produced by the generated gas pressure which is applied to the cup-shaped member 23 thereby forcing the sloped surfaces 33 of the latches 32 against the sloped surface 34 of the extension 13 and forcing the latches into the groove 29. When this occurs, the damper and latches are released to permit independent motion from the casing 10—13. At the beginning of this motion, the piston 16 retracts slightly as oil is transferred through the orifice 22. Although this action is in a direction opposite to the extension, it is beneficial because it provides a cushioning effect which helps to prevent structural failure of the aircraft members at the onset of the high thrust produced by the operating gas of the canopy remover.

This slight motion is equivalent to the travel permitted by the oil passing through orifice or valves in the piston 16 during the stroke of the canopy remover. This damping motion, although slight, serves to cushion the motion as previously stated. The buffer of the present invention thus performs two functions. It functions as a double acting buffer during normal operation and as a shock absorber in case of emergency. Unlatching the buffer inside the canopy remover of course provides a convenient means of disconnecting the double acting buffer from the aircraft while maintaining a relatively simple exterior contour of the canopy opener.

I claim:

1. The combination of a casing attachable at one end to a support, a cylinder enclosing a damping fluid and extending into said casing through the other end thereof, a perforated piston movable in said fluid and fixed to a rod which extends at one end out of said cylinder into said casing and at the other end out of said cylinder for attachment to a load to be moved thereby, means for generating a gas within said casing, a latch surrounding said rod and fixed to the inner end of said cylinder, said latch including a member movable to different positions for locking said cylinder to said casing and unlocking it therefrom, and a latch control piston surrounding said rod and biased to a position which maintains said member in a position to lock said cylinder to said casing, said latch control piston being operable by said gas pressure to release said movable member and unlatch said cylinder from said casing.

2. A combination according to claim 1 wherein said latch control piston has an annular groove adapted to receive said member in the unlatched position of said latch control piston.

3. A combination according to claim 1 wherein said latch includes a cup-shaped member within which said latch control piston moves and wherein said movable member is extensible through the side of said cup-shaped member into a groove on the inner periphery of said casing.

References Cited in the file of this patent

UNITED STATES PATENTS

| | | |
|---|---|---|
| 2,680,746 | Saffell | June 8, 1954 |
| 2,689,697 | Stanley | Sept. 21, 1954 |
| 2,726,576 | Musser | Dec. 13, 1955 |
| 2,815,008 | Hirt | Dec. 3, 1957 |
| 2,857,889 | Stott et al. | Oct. 28, 1958 |
| 2,873,726 | Stott | Feb. 17, 1959 |